United States Patent [19]

Matsuyama

[11] Patent Number: 4,873,888
[45] Date of Patent: Oct. 17, 1989

[54] VISCOSITY DAMPER

[75] Inventor: Jiro Matsuyama, Amagasaki, Japan

[73] Assignee: Mitsubishi Denki Kabushiki Kaisha, Tokyo, Japan

[21] Appl. No.: 175,223

[22] Filed: Mar. 30, 1988

[30] Foreign Application Priority Data

May 26, 1987 [JP] Japan .............................. 62-130214

[51] Int. Cl.⁴ ............................................. F16F 15/16
[52] U.S. Cl. .................................... 74/574; 74/573 F; 188/378
[58] Field of Search ...................... 74/574, 573 F, 573; 188/380, 379, 378, 268; 464/24

[56] References Cited

U.S. PATENT DOCUMENTS

| | | | |
|---|---|---|---|
| 2,198,135 | 4/1940 | Strasburg et al. | 74/574 |
| 2,331,756 | 10/1943 | Zobel | 74/573 |
| 3,187,604 | 6/1965 | Hazel | 74/574 |
| 3,293,939 | 12/1966 | Brown | 74/574 |
| 3,992,963 | 11/1976 | Khanna | 74/574 |

FOREIGN PATENT DOCUMENTS

| | | | |
|---|---|---|---|
| 348710 | 2/1922 | Fed. Rep. of Germany | 74/574 |
| 61-33314 | 9/1986 | Japan . | |
| 3682 | of 1912 | United Kingdom | 74/574 |

Primary Examiner—Rodney M. Lindsey
Attorney, Agent, or Firm—Oblon, Spivak, McClelland, Maier & Neustadt

[57] ABSTRACT

Disclosed is a viscosity damper which includes a damper casing attached to a motor shaft to be driven therewith, a viscous fluid filled in the damper casing and a plurality of inertia bodies each having different diameters which are arranged in a co-axial relation with a space formed therebetween in the radial direction in the damper casing.

3 Claims, 2 Drawing Sheets

VISCOSITY DAMPER

BACKGROUND OF THE INVENTION

1. FIELD OF THE INVENTION

The present invention relates to a viscosity damper for controlling vibrations caused by a motor such as a stepping motor.

2. DISCUSSION OF BACKGROUND

FIGS. 4 and 5 show a conventional viscosity damper described in, for instance, Japanese Examined Utility Model Publication No. 33314/1986. In FIGS. 4 and 5, reference numeral 1 designates the shaft of a stepping motor, numeral 2 designates a damper casing made of a resinous material such as polycarbonate which is attached to the shaft 1, numeral 3 designates an inertia body of a ring form made of metal such as lead, copper or iron, numeral 4 designates a viscous fluid filled in a space formed between the inner wall surface of the damper casing 2 and the inertia body 3. As the viscous fluid, silicon oil is generally used. Numeral 5 designates an introducing opening formed in one side of the damper casing 2 to introduce the viscous fluid 4, amnd a numeral 6 designates a cap for closing the introducing opening 5 after the viscous fluid is introduced. In the inertia body 3, a pair of annular grooves are formed in both side surfaces, and a plurality of through holes 8 are formed to communicate the annular grooves 7 at both side surfaces so that the viscous fluid 4 can be easily introduced in the damper casing 2.

Operation of the conventional viscosity damper will be described.

When the stepping motor shaft 1 is accelerated for rotation, the damper casing 2 is also rotated. In this case, the inertia body 3 is rotated independent of the damper casing 2 because it is not restricted by the casing 2. Accordingly, there takes place relative movement between the inner wall surface of the damper casing 2 and the front surface of the inertia body 3, whereby resistance of viscosity is producted by the viscous fluid 4 having a certain frictional coefficient of viscosity. The resistance of viscosity is against the relative movement between the damper casing 2 and the inertia body 3, whereby a damping force is produced to affect vibration controlling function. The viscosity of the viscous fluid 4 is so selected that a vibration controlling effect can optimally be applied to the moment of inertia of the inertia body 3. Generally, it is determined to be 100-2000 cst. In the conventional viscosity damper, the annular grooves 7 and through holes 8 are formed in the inertia body 3 so that the viscous fluid 4 is easily filled in the small space formed between the damper casing 2 and the inertia body 3.

Thus, in the conventional viscosity damper, the vibration controlling effect is primarily determined by the moment of inertia of the inertia body. Accordingly, when the inertia body having a large moment of inertia is used, it is very effective to vibrations having a large amplitude. On the other hand, when the inertia body having a small moment of inertia is used, it is very effective to vibrations having a small amplitude. However, the conventional viscosity damper could not provide effective vibration controlling effect irrespective of the magnitude of amplitude. Further, the conventional viscosity damper requires machining for the grooves and the through holes for the inertia body to thereby invite a high manufacturing cost.

SUMMARY OF THE INVENTION

It is an object of the present invention to provide a viscosity damper which provides an effective vibration controlling function irrespective of the magnitude of amplitude and no longer requires machining for forming grooves and through holes.

The foregoing and other objects of the present invention have been attained by providing a viscosity damper which comprises a damper casing attached to a motor shaft to be driven therewith, a viscous fluid filled in the damper casing and a plurality of inertia bodies or arrangements each having different diameters which are arranged in a co-axial relation with a space in the circumferential direction in the damper casing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
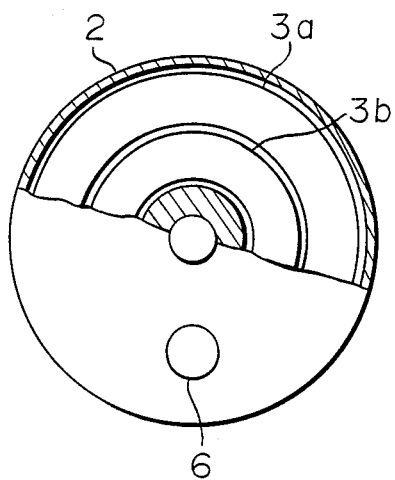
FIG. 1 is a front view partly cut away of an embodiment of the viscosity damper according to the present invention.
Figure 2:
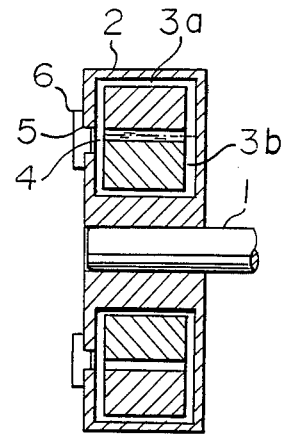
FIG. 2 is a longitudinal cross-sectional view of the viscosity damper shown in FIG. 1.

Referring to the drawings, wherein the same reference numerals designate the same or corresponding parts throughout the several views, and more particularly to FIGS. 1 and 2 thereof, there is shown a front view and a longitudinal cross-sectional view of the viscosity damper of the present invention. In FIGS. 1 and 2, first and second metallic inertia bodies 3a, 3b of a ring shape are contained in the damper casing 2. The first inertia body 3a has an inner diameter greater than the outer diameter of the second inertia body 3b. The first and second inertia bodies 3a, 3b are held in the damper casing 2 in a co-axial relation with a gap formed between the inner diameter of the first inertia body 3a and the outer diameter of the second inertia body 3b. The viscous fluid 4 is filled in the damper casing 2, namely, the gaps between the first and second inertia bodies 3a, 3b and the inner wall of the damper casing 2 and the gap between the inner and outer diameters of the first and second inertia bodies 3a, 3b. As the viscous fluid 4, silicon oil having a viscosity of 100 cst-2000 cst is used.

Operation of the above-mentioned embodiment will now be described. When the motor shaft 1 is accelerated for rotation, the damper casing 2 is also rotated with the shaft 1. Since the inertia bodies 3a, 3b are not restricted by the damper casing 2, they are rotatable independent of the damper casing 2. Accordingly, there takes place relative movement between the inner wall surface of the damper casing 2 and the front surfaces of the inertia bodies 3a, 3b, whereby resistance of viscosity due to the frictional coefficient of the viscous fluid 4 is produced. The resistance of viscosity is against the relative movement between the damper casing 2 and the inertia bodies 3a, 3b, so that a damping force is produced to effect a vibration controlling force.

In this case, the first inertia body 3a having the larger diameter can act on vibrations having a large amplitude, and the second inertia body 3b having the smaller diameter can act on vibrations having a small amplitude. Thus, the embodiment of the present invention is effective to both the vibrations having large and small amplitudes.

In the embodiment of the present invention, an annular gap is formed between the first and second inertia bodies 3a, 3b, whereby the introduction of the viscous fluid 4 into small gaps formed between the inertia bodies 3a, 3b and the damper casing 2 can be easily accomplished.

In the embodiment shown in FIGS. 1 and 2, two inertia bodies having different diameters are used. However, three or more inertia bodies each having different diameters may be used so that they are arranged in a co-axial relation. In this case, more effective vibration controlling function can be obtained for a variable degree of amplitude, and introduction of the viscous fluid 4 can be further easily carried out.

Figure 3:
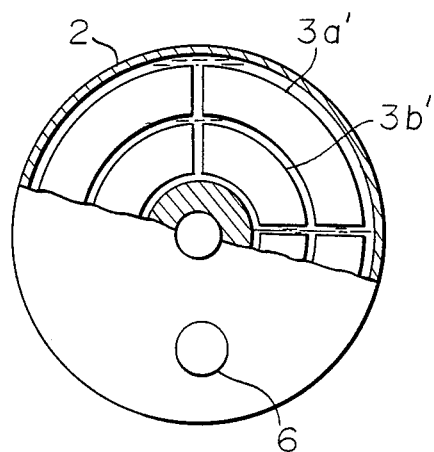
FIG. 3 is a front view partly cut away of another embodiment of the present invention.
Figure 4:
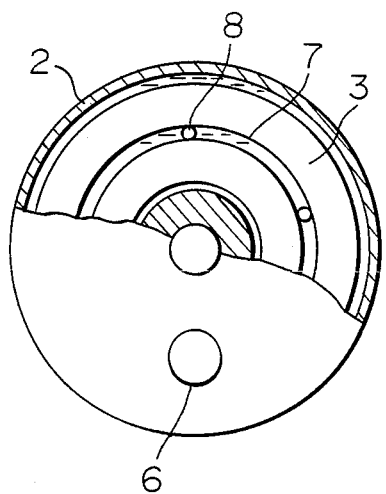
FIG. 4 is a front view partly cut away of a conventional viscosity damper.
Figure 5:
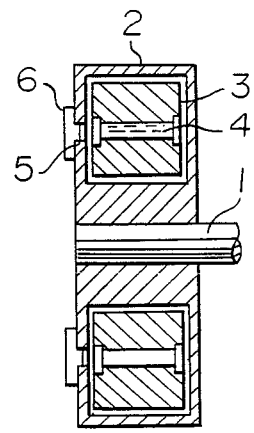
FIG. 5 is a longitudinal cross-sectional view of the viscosity damper shown in FIG. 4.

FIG. 3 shows another embodiment of the viscosity damper of the present invention. In this embodiment, each of the first and second inertia body arrangments 3a', 3b' is split into four pieces in the circumferential direction and have a different arc radius. In this embodiment, the viscous fluid 4 can be further easily introduced in the damper casing 2.

Thus, in the viscosity damper of the present invention, a plurality of inertia bodies or arrangements each having the different diameters are arranged in a co-axial relation with a gap between them in the damper casing. Accordingly, a uniform vibration controlling effect can be obtained irrespective of the magnitude of the amplitude of the vibrations. Further, the viscous fluid can be easily filled in the damper casing. In addition, the manufacturing cost of the viscosity damper is low because it is unnecessary to form a groove and a through hole in the inertia body.

Obviously, numerous modifications and variations of the present invention are possible in light of the above teachings. It is therefore to be understood that within the scope of the appended claims, the invention may be practiced otherwise than as specifically described herein.

What is claimed is:

1. A viscosity damper which comprises:
   a damper casing attached to a motor shaft to be driven therewith;
   a viscous fluid filled in said damper casing and
   at least two inertia bodies each being surrounded by said viscous fluid so as not to be restricted from moving by said casing and so as to be movable independent of said casing and having different diameters and which are arranged in a co-axial relation with a space formed between said inertia bodies in the radial direction in said damper casing.

2. The viscosity damper according to claim 1, wherein said inertia bodies have a ring shape.

3. A viscosity damper which comprises:
   a damper casing attached to a motor shaft to be driven therewith;
   a viscous fluid filled in said damper casing; and
   at least two inertia body arrangements each being surrounded by said viscous fluid so as not to be restricted from moving by said casing and so as to be movable independent of said casing and having different arc radius which are arranged in a co-axial relation with a space formed between said inertia body arrangments in the radial direction in said damper casing wherein each said inertia body arrangement is split in the circumferential direction into a plurality of pieces.

* * * * *